United States Patent Office 3,471,532
Patented Oct. 7, 1969

3,471,532
OXIDATION OF OLEFINS
Donald C. Young, Fullerton, Calif., assignor to Union Oil Company of California, Los Angeles, Calif., a corporation of California
No Drawing. Filed Oct. 9, 1967, Ser. No. 673,992
The portion of the term of the patent subsequent to Oct. 9, 1984, has been disclaimed and dedicated to the Public
Int. Cl. C11c 3/00; C07c 69/76, 41/00
U.S. Cl. 260—410.9
10 Claims

ABSTRACT OF THE DISCLOSURE

Hydrocarbon olefins are oxidized to carbonyl and other oxygenated compounds by contacting a gas mixture of the olefin, oxygen and a protonic reactant with a catalyst comprising an anion exchange solid having ionically bonded thereto, at its ion exchange sites, a negatively charged complex of a Group VIII noble metal. The oxidation is performed at relatively mild conditions including temperatures from 30° to 300° C. and pressures from atmospheric to 1000 atmospheres. When the protonic reactant is a carboxylic acid, the resultant product is the alkenyl ester of the carboxylic acid. When the protonic reactant is water, the resultant product is a carbonyl, i.e., aldehyde, ketone or carboxylic acid. When the protonic reactant is an alkanol, the resultant product is an acetal.

The vapor effluent from the reaction zone is recovered and the oxygenated product removed therefrom in unconverted olefin and reactants are returned for further reaction.

DESCRIPTION OF THE INVENTION

The invention relates to the oxidation of olefins to oxygenated products including carbonyl compounds, unsaturated esters and unsaturated ethers or acetals.

The oxidation of hydrocarbon olefins to the aforementioned oxygenated products using Group VIII noble metal catalyst is a fairly well established art. These processes have generally employed liquid phase, homogeneous catalysis using a soluble salt or complex of the Group VIII noble metal. In some adaptations, vapor phase oxidation conditions have been employed by the impregnation of a solid support with a salt of the Group VIII noble metal. The catalyst has been used in this form or has been reduced and/or oxidized to provide the Group VIII noble metal in metallic form or as an oxide.

When vapor phase conditions are employed, use of a salt of a Group VIII noble metal is not entirely satisfactory because the anion of the particular salt involved is often volatilized from the reaction zone and the catalyst is transformed to the metallic state. The metal of the catalyst, however, does not possess the high degree of reactivity as the ionic or salt catalyst. Since the course of the reaction depends upon the pi-bonding characteristics of the catalyst, it is readily apparent that since the ionic form of the Group VIII noble metal is more electrophilic, the salts or oxide should be more active for the catalysis.

I have now found that vapor phase catalysis of the aforementioned oxidations can be performed and the catalyst retained in a high degree of activity over a prolonged period of time by employing the Group VIII noble metal as a negatively charged complex that is ionically bonded to the ion exchange sites of an anion exchange solid and contacting the catalyst with oxygen, the olefin and the protonic reactant. Various redox compounds can be incorporated in the catalyst to facilitate the reaction rate. These are the typical redox compounds heretofore employed in the aforementioned liquid phase contacting.

These generally are salts and complexes of multivalent metal ions, nitrogen oxides or organic redox agents such as benzoquinone. The contacting is effected at temperatures from 30° to 300° C. and pressures from atmospheric to 1000 atmospheres; preferably from about 10 to about 100 atmospheres, the higher pressures being employed to favor the higher rate of reaction.

The catalyst can be employed neat or can be comingled with an inert finely divided solid in the reaction zone. The solid-gas contacting can be fluidized wherein the catalyst is used as a finely divided solid which is suspended in an upflowing current of the reactant gases. Other contacting techniques include passing the gas mixture through a reactor packed with catalyst particles using downflow or upflow of the reactants through the packed reactor bed. Under either processing condition, the gaseous effluent from the reaction zone contains the oxidized product as well as unconverted reactant and olefin. This effluent is cooled and the product condensed therefrom while the unconverted reactants are separated and returned for conversion. Conventional condensation and fractionation techniques are employed to purify the product from the effluent stream.

Various organic and inorganic solids possessing the capacity to base exchange an associated anion for an anion in a polar solvent, e.g., alcohols, carboxylic acids or aqueous solutions can be employed as the ion exchange solid. Solids having base exchange capacities from about 1 to about 500 milliequivalents per 100 grams can be used. These solids should be inert to the reaction solvent and insoluble therein. Various anion exchange solids which comprise high molecular weight polyelectrolytes that are crosslinked into an insoluble matrix can be used. These polyelectrolytes can be organic and in this form generally comprise a synthetic polymer containing basic nitrogen functional groups which contain the nitrogen in its positive valency, e.g., ammonium, quaternary ammonium, amidinium radicals, etc. The polymer molecular weight can be from 2500 to 500,000 units. Examples of such are polystyrene resins containing along the polymer length side chains bearing quaternary amines. To introduce crosslinking, styrene is frequently polymerized with divinylbenzene containing dependent basic nitrogen groups which are subsequently treated to convert the basic nitrogen to the ion-exchanging ammonium group. Other examples of organic resins that can be employed comprise polyalkylene amines crosslinked by copolymerization with diolefins forming an alkylene bridge. The amine functional groups are of course converted to ammonium groups to impart base exchange properties.

The preparation of the organic anion exchange resins is conventional in the art. A suitable preparation is as follows: 500 grams water, 400 grams m-phenylenediamine, 225 grams concentrated hydrochloric acid and 210 grams of ice are stirred until the m-phenylene dissolves. Then 60 grams of polyethylenediamine, 150 grams of hydrochloric acid and 150 grams of ice are added and the temperature is raised to 8° to 11° C. To the mixture is then added 825 grams formaldehyde and the temperature is lowered to 2°–3° C. by addition of 150 grams ice. After several hours, the resin is separated from the liquid medium and dried.

In another preparation, a copolymer of styrene and divinyl benzene containing 9 mols styrene per mol divinyl benzene is nitrated, then reduced. To 20 parts nitric acid and 30 parts sulfuric acid are added 12 parts of the copolymer. The mixture is refluxed for 2 hours, filtered and the resin washed. The nitration is repeated and the resin finally washed and dried. The nitrated copolymer is then reduced with 23 parts stannous chloride and 100 parts hydrochloric acid at reflux temperature. The product is washed with dilute sodium hydroxide and dried.

Organic anion exchange resins are commercially available and the following is a listing of some of the commercially available materials:

Amberlite IRA-400 and IRA-401 which comprise a crosslinked polystyrene matrix having quaternary nitrogens in trimethyl amine groups along the polystyrene chain and are available from the Rohm & Haas Company.

Duolite A-2 and A-3 of similar structure, available from The Chemical Process Company; and Dowex-1, -2 and -3 which are styrene divinyl benzene copolymers containing quaternary nitrogens as amine groups along the chain length and are available from the Dow Chemical Company; etc.

In general, the organic anion exchange solids have base exchange capacities from about 50 to about 400 milliequivalents per 100 grams of dry resin.

The inorganic anion exchange solids are preferred for use where the reaction conditions are too severe for most organic resins. In general, the organic resins can be obtained that are resistant to thermal and oxidative degradation up to temperatures of about 150°–200° C. The use of reaction conditions more severe than aforementioned requires the use of more stable ion exchange solids. For this use, the inorganic solids possessing anion exchange capacity are preferred, and examples of such are hydrous oxides of various metals, e.g., zirconium oxide, aluminum oxide, chromium oxide, ferric oxide, bismuth oxide, titanium oxide, thorium oxide, tin oxide, niobium oxide, tantalum oxide, etc. These hydrous oxide ion exchange solids can be prepared by suitable precipitation reactions as described in Journal of American Chemical Society, 78, pages 249 and 694 (1956), by K. A. Krouse and H. O. Phillips. The preparation in general comprises raising the pH of a solution of the metal so as to precipitate the metal as a hydrous oxide. Such precipitation can be effected by the addition of base, usually ammonia, to acidic solutions of the particular metal. The flocculant or gelatinous precipitate is collected by conventional solid-liquid separation, e.g., centrifugation or filtration. The recovered solid is dried, ground and sized to the desired subdivision. Materials suitable for use as inorganic ion exchange solids are commercially available from the Bio-Rad Laboratories, Richmond, Calif.

The platinum group metal employed can be of the palladium subgroup or platinum subgroup, i.e., palladium, rhodium, ruthenium or palladium, osmium or iridium. While all of these metals are active for my reaction, I prefer palladium because of its much greater activity.

The platinum group metal is incorporated in the anion exchange resin by preparing a negatively charged complex of the platinum group metal with a suitable ligand and then base exchanging the complex onto the resin. Preferably, a halogen complex such as the chloro or fluoro complex is employed; however, platinum group metals also from negatively charged complexes with the following ligands which may therefore also be used: iodo, bromo, hydroxyl, oxalato, thiocyano, nitro and cyano. Illustrative of such negatively charged complexes are the following:

Trichloroplatinate,
Tetrachloroplatinate,
Hexacyanorhodate,
Hexanitrorhodate,
Hexachlororhodate,
Hexathiocyanorhodate,
Hexachloroiridate,
Hexabromoiridate,
Hexafluororuthenate,
Hexachlororuthenate,
Pentachloronitroruthenate,
Pentacyanonitroruthenate,
Pentachlorohydroxyruthenate,
Hexachloroosmate,
Hexabromoosmate,
Hexachlororhenate,
Tetrachlororhenate,
Hexabromorhenate,
Octacyanorhenate,
Hexachloropalladate,
Hexabromopalladate.

The preparation of the complex is apparent to those skilled in the art, e.g., see Advanced Inorganic Chemistry by F. A. Cotton and G. Wilkinson (1962). In general, a soluble salt of the platinum group metal is added to a solution of the ligand such as aqueous hydrochloric acid, hydrofluoric acid in acetic acid, oxalic acid, aqueous thiocyanic acid, alcoholic nitric acid, aqueous cyanic acid, etc. The ligand should generally be present in an amount sufficient to insure complete complexing of the platinum group metal, generally between 0.1 and 2 normal solutions of the aforementioned acids are sufficient. Formation of the halo complexes can be favored by bubbling the particular halogen into the solution during the preparation.

The resulting solution of the negatively charged complex is thereafter contacted with the solid anion exchange solid; preferably at ambient temperatures and atmospheric pressure to base exchange the complex for the anion associated with the ion exchange site of the exchange solid. The solid can then be washed, dried and packed into the reactor.

The amount of platinum group metal base exchanged onto the anion exchange solid can vary between about .01 and about 10.0 weight percent of the composite, depending on the base exchange capacity of the solid. Preferably, the platinum group metal is deposited in an amount sufficient to equal the exchange capacity of the ion exchange solid, e.g., in amounts from 10 to 100; preferably from 50 to 95 percent of the exchange capacity of the anion exchange solid.

After the platinum group metal has been exchanged onto the anion exchange solid, the latter can be pulverized to the desired degree of subdivision or can be admixed with inert solids together with a suitable binder and the resultant mixture pelleted or extruded to prepare particles having the proper size for use in a packed fixed bed reactor. The size of particles so prepared depends substantially upon the type of gas-solid contacting technique employed in the process. The catalyst can also be employed as more or less granular pellets or extrudates in a packed fixed bed reactor or fluidized as finely divided particles suspended in an upflowing gas stream. When employed in the fluidized technique, the particle size of the solid can be such that passes a 20 but is retained on a 400 mesh screen. When a fixed bed reactor is to be employed, the average particle diameter is preferably from about $\frac{1}{16}$ to about $\frac{1}{4}$ inch.

The ion exchange solid charged with the platinum group metal can be employed in admixture with various other solids such as silicas, e.g., silica gel, diatomaceous earth, quartz, etc., silicon carbides, e.g., Carborundum, titanium; carbon; etc. This dilution with an inert solid is preferred in the fixed bed technique to dilute the highly active catalyst and thereby prevent runaway reactions.

As previously mentioned, various redox compounds can, optionally, be incorporated in the catalyst. In general, the catalyst carrier can be impregnated with any multivalent salt having an oxidation potential higher, i.e., more positive, than the Group VIII noble metal. Typically of such are the soluble salts of multivalent metal ions such as the acetates, bromides or chlorides of copper, iron, manganese, cobalt, mercury, nickel, cerium, bismuth, tantalum, chromium, molybdenum or vanadium. Of these, cupric and ferric salts are preferred and cupric salts are most preferred. In general, any of the aforementioned metal salts can be incorporated on the catalyst to provide a concentration of metal thereon between about 0.01 and about 15 weight percent; preferably between about 0.5 and about 5 weight percent.

Various other oxidizing agents can also be incorporated in the catalyst. Included in such agents are the nitrogen oxide salts such as the nitrates, nitrites, which can be impregnated on the carrier. These can also be employed jointly with the aforedescribed redox metal salts. In general, between about 0.01 and about 5 weight percent of the catalyst can comprise an impregnated nitrogen oxide salt. This can be accomplished by treatment of the solid catalyst with a nitrogen oxide containing material such as nitric acid or a nitrate or nitrite salt. Examples of such are sodium nitrate, lithium nitrate, cesium nitrite, potassium nitrite, calcium nitrate, manganese nitrate, cadmium nitrite, chromium nitrate, cobalt nitrate, nickel nitrate, etc.

Olefins that can be oxidized to carbonyl compounds in my oxidation can be any hydrocarbon olefin having from 2 to about 25 carbons. Examples of specific olefins are: ethylene, propylene, butene-1, butene-2, pentene-1, pentene-2, hexene-1, hexene-2, heptene-1, octene-1, 3-ethylpentene-1, nonene-1, decene-1, butadiene, pentadiene, cyclopentene, cyclohexene, indene, styrene, allylbenzene, etc.

Carbonyl products from oxidation in the aqueous acid medium comprise acetaldehyde, methyl ethyl ketone, acetone, cyclohexanone, acetophenone, etc., the oxygen atom replacing a hydrogen atom on one of the olefinic carbons, preferentially the hydrogen on a secondary carbon. Esters of carboxylic acids and unsaturated alcohols are obtained when the reaction medium comprises the carboxylic acid, e.g., vinyl acetate, allyl acetate, propenyl acetate, vinyl propionate, vinyl benzoate, etc. Acetals and ketals are obtained from the olefins when the reaction medium comprises an alcohol. Examples of such products are 1,1-diethoxyethane, 1,1-dimethoxyethane, 1,1-diisopropoxyethane, 2,2-dimethoxypropane, etc.

It is therefore apparent that the product of the oxidation depends upon the protonic reactant used. To prepare aldehydes and ketones from olefins, water vapor is introduced into the reaction zone.

For the oxidation of olefins to acetals and ketals, an aliphatic alcohol is introduced into the reaction zone. Aliphatic alcohols having 1 to about 20 carbons can be employed as this reactant such as methanol, ethanol, isopropanol, propanol, butanol, isobutanol, pentanol, isopentanol, hexanol, isohexanol, heptanol, isoheptanol, cyclohexanol, octanol, isooctanol, decanol, isodecanol, tridecanol, isododecanol, pentadecanol, isohexadecanol, octadecanol, tricosanol, isotetracosanol, pentacosanol, etc. Preferably, primary or secondary low molecular weight alcohols, having from 1 to about 5 carbons are employed such as methanol, decanol, propanol, isopropanol, butanol, isobutanol, pentanol, isopentanol, cyclopentanol, etc.

For the preparation of unsaturated esters of carboxylic acids, the protonic reactant is a carboxylic acid having from 1 to about 20 carbons such as acetic, propionic, butyric, valeric, isovaleric, caprylic, isocapyrlic, lauric, stearic, succinic, glutaric, butyric, adipic, pimelic, etc. The carboxylic acid employed is the acid of the desired acyloxy radical desired in the unsaturated ester, e.g., acetic acid is used in the preparation of vinyl acetate, propionic acid is employed in the preparation of vinyl propionates, etc.

In the oxidation of olefins to unsaturated esters, the yields of ester product can be greatly increased by the addition of various carboxylate salts to the catalyst. Generally, any soluble carboxylate salt can be added such as alkali metal carboxylates, alkaline earth carboxylates, any of the aforementioned Group VIII noble metal carboxylates or a carboxylate salt of the optional redox metals previously described. The alkali metal carboxylates, e.g., lithium acetate, potassium propionate, sodium valerate, etc., are preferred. Generally, between about 0.1 and about 10 weight percent of a carboxylate salt and preferably between about 0.5 and about 5.0 weight percent can be impregnated on the carrier.

The oxidation conditions comprise temperatures from about 15° to 300° C. and pressures from atmospheric to 100 atmospheres with elevated pressures being preferred to obtain a high oxidation rate. In the oxidation of olefins to unsaturated esters, e.g., ethylene to vinyl acetate, the olefin, oxygen and carboxylic acid are introduced into contact with the catalyst at temperatures between about 30° and about 300° C. Temperatures from about 90° to about 180° C. are preferred and, to obtain optimum yields of unsaturated esters, temperatures between about 120° and about 160° C. are most preferred.

In the oxidation of olefins to acetals, particularly the oxidation of ethylene to 1,1-diethoxyethane, temperatures between about 30° and about 200° C. and particularly between about 80° and about 150° C. are preferred.

The reaction pressures employed in the oxidations are from atmospheric to about 1000 atmospheres or more. Preferably, the reaction pressure is from about 10 to about 100 atmospheres, and the higher pressures are used to favor the reaction rate. Under the aforedescribed conditions, the olefin is rapidly oxidized to the desired oxygenated compounds. The effluent from the reactor is cooled and the products are condensed therefrom and subsequently fractionated when necessary to recover the desired product in a high degree of purity using conventional techniques. The unconverted reactants such as the olefin and unreacted ion donating reactant are recycled to the reaction zone.

The invention will now be illustrated by the following exemplified disclosure:

EXAMPLE 1

A commercially available organic ion-exchange solid, Dowex 21K, resin, is contacted with an aqueous solution of palladium dichloride in dilute hydrochloric acid. The contacting is continued until the aqueous solution loses its red color and the resin becomes red. Thereafter the catalyst is removed from the solution, dried and placed in a U-shaped tubular reactor. The ends of the reactor are stoppered and opposite ends are provided with a gas inlet and a gas outlet tube. The reactor is then immersed in a bath of acetic acid which is maintained at its reflux temperature of 118° C. Ethylene is bubbled through a flask partially filled with acetic acid at about 100° C. and the mixed ethylene-acetic acid vapors from this flask are admixed with a small amount of oxygen and the resultant mixture is passed into the U-shaped reactor to contact the catalyst. The gaseous effluent from the reactor is bubbled into a flask filled with acetic acid and the vapor from the acetic acid bubbler is passed through a trap cooled with a mixture of Dry Ice and acetone.

The reactants are passed over the catalyst for a reaction period of several hundred hours during which time the catalyst continues to exhibit activity for the oxidation of ethylene to vinyl acetate. The activity is checked periodically throughout the reaction period by replacing the product trapping system with a flash system and analyzing the removed product traps for vinyl acetate and acetaldehyde and using a gas chromatography analysis.

When the experiment is repeated using a catalyst prepared identically to that aforedescribed but in addition containing about 3 weight percent cupric chloride impregnated thereon from the aqueous solution, vinyl acetate is produced during the reaction but at an increased rate of reaction from that observed in the preceding experiment.

A similar increase in reactivity is observed when the anion exchange resin is ion-exchanged with an aqueous solution of palladium chloride containing lithium acetate. Drying of the solution deposits about 3 weight percent lithium acetate on the resin and this acetate increases the reaction rate observed when the catalyst is used in the oxidation.

EXAMPLE 2

An inorganic ion-exchange solid-palladium complex is prepared by placing 1000 grams of a commercial zirconium oxide anion exchange solid (Bio-Rad HZO-1) in a flask to which is added a solution of 500 milliliters acetic acid containing 25 grams lithium chloride, 25 grams lithium acetate dihydrate, and 33 grams palladium chloride. The mixture is stirred at room temperature for 12 hours, filtered and the separated solid is washed with acetic acid and then dried.

The solid is placed in a tubular reactor adapted for the introduction of a reactant gas mixture at elevated pressure and provided with means for heating of the reaction zone. The reactor is heated to a temperature of about 200° C. and a mixture of ethylene and water vapor containing 10 volume percent oxygen is introduced at 300 p.s.i.g. The vapor effluent from the reactor is cooled and the liquid condensate is separated from the vapor which is then passed through an acetic acid bubbler and a trap cooled with an acetone Dry Ice mixture. The condensate and trapped products are analyzed and found to comprise chiefly acetaldehyde and some acetic acid.

When the experiment is repeated with the simultaneous introduction of acetic acid vapors into the reactor the product obtained comprises chiefly vinyl acetate with some acetaldehyde which are recovered in the liquid condensate.

When the reaction is repeated with the introduction of vapors of ethanol into the reaction zone the product obtained in the liquid condensate comprises chiefly diethyl acetyl.

The preceding examples are intended solely to illustrate the preferred mode of practice of the invention and are not intended to be unduly limiting thereof. Instead, it is intended that the invention be defined by the reagents and method steps and their obvious equivalents set forth in the following claims.

I claim:

1. In the oxidation of a hydrocarbon olefin to an oxygenated product consisting of unsaturated esters of carboxylic acids, acetals and ketals, and aldehydes and ketones; wherein the olefin and oxygen are contacted under vapor phase conditions in a reaction zone at a temperature from 15° to 300° C. and a pressure from atmospheric to about 1000 atmospheres and in the presence of a reactant selected from the class consisting of aliphatic carboxylic acids having one to about 20 carbons, aliphatic monohydroxy alcohols having 1 to about 20 carbons and water; to prepare said unsaturated esters when said reactant is a carboxylic acid, to prepare acetals and ketals when said reactant is an alcohol and to prepare aldehydes and ketones when said reactant is water; the improvement that comprises effecting said contacting by introducing a gas mixture consisting essentially of said olefin, oxygen and said reactant into contact with a catalyst comprising an anion exchange solid having a basic exchange capacity from 1 to about 500 milliequivalents per 100 grams and having ionically bonded to the ion exchange sites thereof a negatively charged complex of a Group VIII noble metal selected from the class consisting of halo, hydroxyl, oxalato, thiocyano, nitro and cyano complexes of said noble metal.

2. The oxidation of claim 1 comprising the additional step of incorporating from 0.1 to 10 weight percent of an alkali metal carboxylate in said catalyst.

3. The oxidation of claim 1 wherein said catalyst also comprises from 0.1 to 10 weight percent of a redox agent.

4. The oxidation of claim 1 wherein a gaseous effluent is removed from the contacting zone, the oxygenated product is recovered therefrom and the unreacted olefin and reactant are recycled to further contacting.

5. The oxidation of claim 1 wherein said Group VIII noble metal is palladium.

6. The oxidation of claim 1 wherein said complex is a chloropalladate.

7. The oxidation of claim 3 wherein said redox agent is the salt of a multivalent metal having an oxidation potential more positive than that of said Group VIII noble metal.

8. The oxidation of claim 1 wherein the anion exchange solid is an organic polymer containing basic nitrogen cationic groups and having a molecular weight from 2500 to 500,000.

9. The oxidation of claim 1 wherein the anionic exchange solid is an inorganic hydrous oxide selected from class consisting essentially of zirconium oxide, aluminum oxide, chromium oxide, ferric oxide, bismuth oxide, titanium oxide, thorium oxide, tin oxide, niobium oxide and tantalum oxide.

10. The oxidation of claim 3 wherein the said redox agent is selected from the class consisting of copper chloride, copper bromide, iron chloride and iron bromide.

References Cited

UNITED STATES PATENTS

| | | | |
|---|---|---|---|
| 3,122,586 | 2/1964 | Berndt et al. | 260—597 |
| 3,131,223 | 4/1964 | Smidt et al. | 260—597 |
| 3,346,623 | 10/1967 | Young | 260—497 |

FOREIGN PATENTS 618,071  9/1962  Belgium.

LORRAINE A. WEINBERGER, Primary Examiner

V. GARNER, Assistant Examiner

U.S. Cl. X.R.

260—476, 485, 497, 592, 586, 597, 604, 611, 615